(12) United States Patent
Gamon (10) Patent No.: US 8,893,396 B2
(45) Date of Patent: Nov. 25, 2014

(54) PIPE AND CONDUIT ALIGNMENT SYSTEM AND METHOD

(71) Applicant: Daniel F. Gamon, Kansas City, KS (US)

(72) Inventor: Daniel F. Gamon, Kansas City, KS (US)

( * ) Notice: Subject to any disclaimer, the term of this patent is extended or adjusted under 35 U.S.C. 154(b) by 225 days.

(21) Appl. No.: 13/660,515

(22) Filed: Oct. 25, 2012

(65) Prior Publication Data

US 2014/0115907 A1 May 1, 2014

Related U.S. Application Data

(60) Provisional application No. 61/552,946, filed on Oct. 28, 2011.

(51) Int. Cl.
*G01B 11/27* (2006.01)

(52) U.S. Cl.
USPC ............................................... 33/286; 33/529

(58) Field of Classification Search
USPC ............ 33/286, 354, 381, 412, 529, 613, 645
See application file for complete search history.

(56) References Cited

U.S. PATENT DOCUMENTS

| 6,124,935 | A | * | 9/2000 | Matthews ....................... 33/286 |
| 6,286,219 | B1 | | 9/2001 | Palumbo, II |
| 6,643,019 | B1 | | 11/2003 | Jeanneret |
| 6,915,582 | B1 | * | 7/2005 | Engels ............................ 33/286 |
| 7,155,834 | B2 | | 1/2007 | Palumbo, III et al. |
| 2002/0133960 | A1 | * | 9/2002 | Cross .............................. 33/412 |
| 2005/0060901 | A1 | * | 3/2005 | Cook .............................. 33/286 |
| 2012/0117813 | A1 | * | 5/2012 | Stevenson et al. .............. 33/286 |
| 2012/0297635 | A1 | * | 11/2012 | Mickow .......................... 33/286 |
| 2013/0326891 | A1 | * | 12/2013 | Alexander et al. ............. 33/286 |

* cited by examiner

*Primary Examiner* — G Bradley Bennett
(74) *Attorney, Agent, or Firm* — Law Office of Mark Brown, LLC; Christopher M. DeBacker; Mark E. Brown (57) ABSTRACT

A laser alignment device for use with rigid tubing of varying diameters, such as electrical conduit or plumbing piping. An embodiment of the laser alignment device includes a slide mechanism with a number of measurement indicator markings on at least one face. The slide mechanism allows the laser position to be adjusted depending on the diameter of the tubing. The primary function of the alignment device is to produce a laser beam at or near the dead-center of the tubing as it is being installed. This allows the installer to quickly ensure that existing or new sections of tubing are installed correctly and in-line. A plurality of mirror attachments may be used to alter the direction of the laser beam for turns or bends in the run of the length of tubing.

13 Claims, 14 Drawing Sheets

PIPE AND CONDUIT ALIGNMENT SYSTEM AND METHOD

CROSS-REFERENCE TO RELATED APPLICATION

This application claims priority in U.S. provisional patent application Ser. No. 61/552,946, filed Oct. 28, 2011, which is incorporated herein by reference.

BACKGROUND OF THE INVENTION

1. Field of the Invention

The present invention relates generally to a system and method for aligning pipes and conduits using a laser, and more particularly to a laser apparatus mount including adapters and mirrors for pipe and conduit alignment.

2. Description of the Related Art

There is a great desire in the field of construction for pipes and conduits to be hung in an organized manner to save space and material costs. Persons employed in the construction field use all manner of devices to determine the proper length, angle, and placement of pipes, conduits, and other elements of building infrastructure, such as tape measures and bubble-levels.

Tape measures, levels, and other tools used in the field of construction are imprecise due to human error and limitations of the tools themselves. Tape measures, for instance, may produce inaccurate results at long distances due to bending or slacking of the tape. Further, using tape measures requires the user to hold the tape with one hand while marking a spot with a second hand. This often leads to imprecise measurements and markings. Similarly, bubble levels must constantly be placed and replaced to ensure a pipe or conduit remains level.

Laser alignment devices have recently been employed by construction workers and home decorators to align all manner of items, including pipes and picture frames. However, existing laser alignment devices are limited. It would be difficult or impossible to locate the dead-center of a length of pipe or conduit using a hand-held laser. Existing laser alignment devices designed to be placed on a pipe-end to provide dead-center positioning fail to provide a means to adapt to different pipe sizes and connection types. Further, existing laser alignment devices only provide single- or double-directional guidance. If an obstacle is in the path of an existing laser alignment tool, a user will have to resort to tape measures, levels, and multiple laser-placements to determine an optimal path around that obstruction.

What is desired is a laser alignment tool designed explicitly for pipes and conduits of any and all sizes and connection types, and which provides a means by which a user may determine a path around an existing obstruction with a single placement of the laser alignment device.

Heretofore there has not been available a system and method for aligning pipes and conduits with the features and elements of the present invention.

BRIEF SUMMARY OF THE INVENTION

The present invention relates to a laser alignment system and method for pipes and conduits. A laser alignment mount includes a plurality of adaptors which allow the alignment tool to mount to the end of conduits or pipes of all sizes and connection types. This ensures that the laser provides a dead-center alignment of any pipe being placed. The laser provides an indication on an adjacent wall or structure which the user can mark, and ensures a straight and level pipe alignment.

An exemplary embodiment of the present invention includes a standard bubble level to ensure that the mount is level when connected to an existing pipe. The bubble level may include horizontal, vertical, and diagonal indicators, depending on the user's preference.

The exemplary embodiment of the present invention further includes a nose-piece which allows an extendable mirror attachment or an elbow attachment to be temporarily affixed to the mount. This allows the user to properly anticipate a turn in the run of pipe, or to avoid obstacles in the pipe's path in the most efficient manner possible.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Embodiment or Aspect Laser Alignment Apparatus 2

Figure 1:
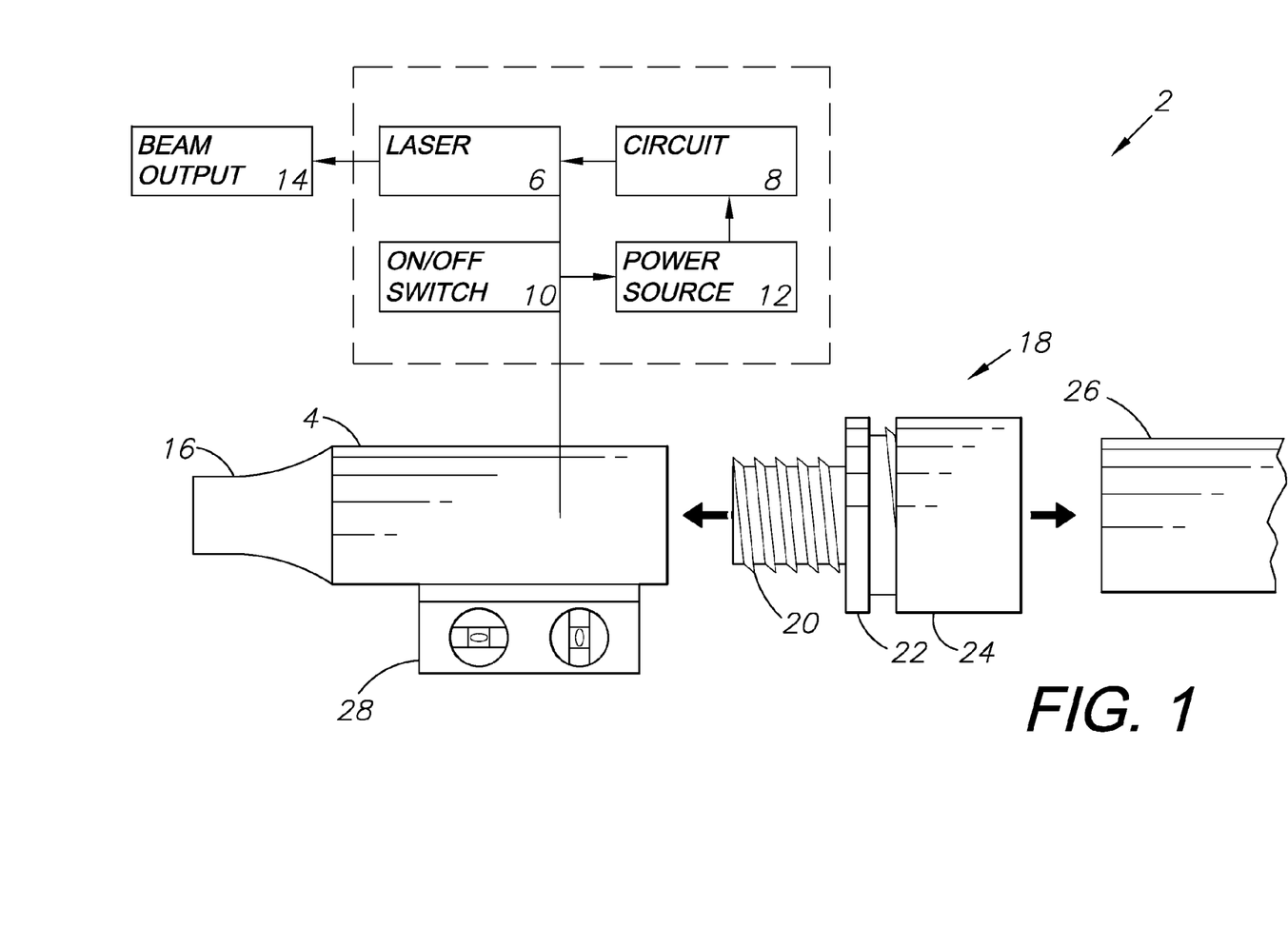
FIG. 1 is a side elevation view of an embodiment of the present invention including a schematic diagram of included components.

Referring to the drawings in more detail, FIG. 1 shows an exemplary embodiment of a laser alignment apparatus 2. The apparatus includes a housing tube 4 containing the components which produce an alignment laser beam 14, including a laser element 6, an electrical circuit 8, an on/off switch 10, and a power source 12, such as a battery. These components produce a laser beam output 14 which is used to properly align a section of pipe or conduit.

An attachment nose 16 is affixed to the front end of the housing tube 4. The beam 14 emerges from this end of the alignment apparatus 2. The attachment nose 16 allows additional attachment tools to temporarily be affixed to the alignment apparatus 2 to adjust or alter the alignment beam.

A bubble level 28 is attached to the housing tube 4. The level may be temporarily or permanently affixed, and may contain any number of standard level angles. In an exemplary embodiment, only vertical and horizontal directions are included.

A pipe adapter 18 is affixed to the rear end of the alignment apparatus 2. The adapter 18 may be of any size and shape to properly connect the alignment apparatus 2 with an existing pipe section 26. In the exemplary embodiment shown in FIG. 1, the adapter 18 includes a threaded connection 20 for temporarily joining to the housing tube 4 of the alignment apparatus 2. An adapter body 22 and adaptor locking ring 24 allow the alignment apparatus 2 to be temporarily but firmly joined to a pipe section 26 by using a pipe-joint method common in the field. The adapter 18 connection must allow for quick release from the pipe section 26 when the user is ready to hook up the next section of pipe, but must remain rigidly connected to the pipe when the adapter 18 is locked. This ensures that the alignment position given by the laser 6 is accurate.

Figure 2:
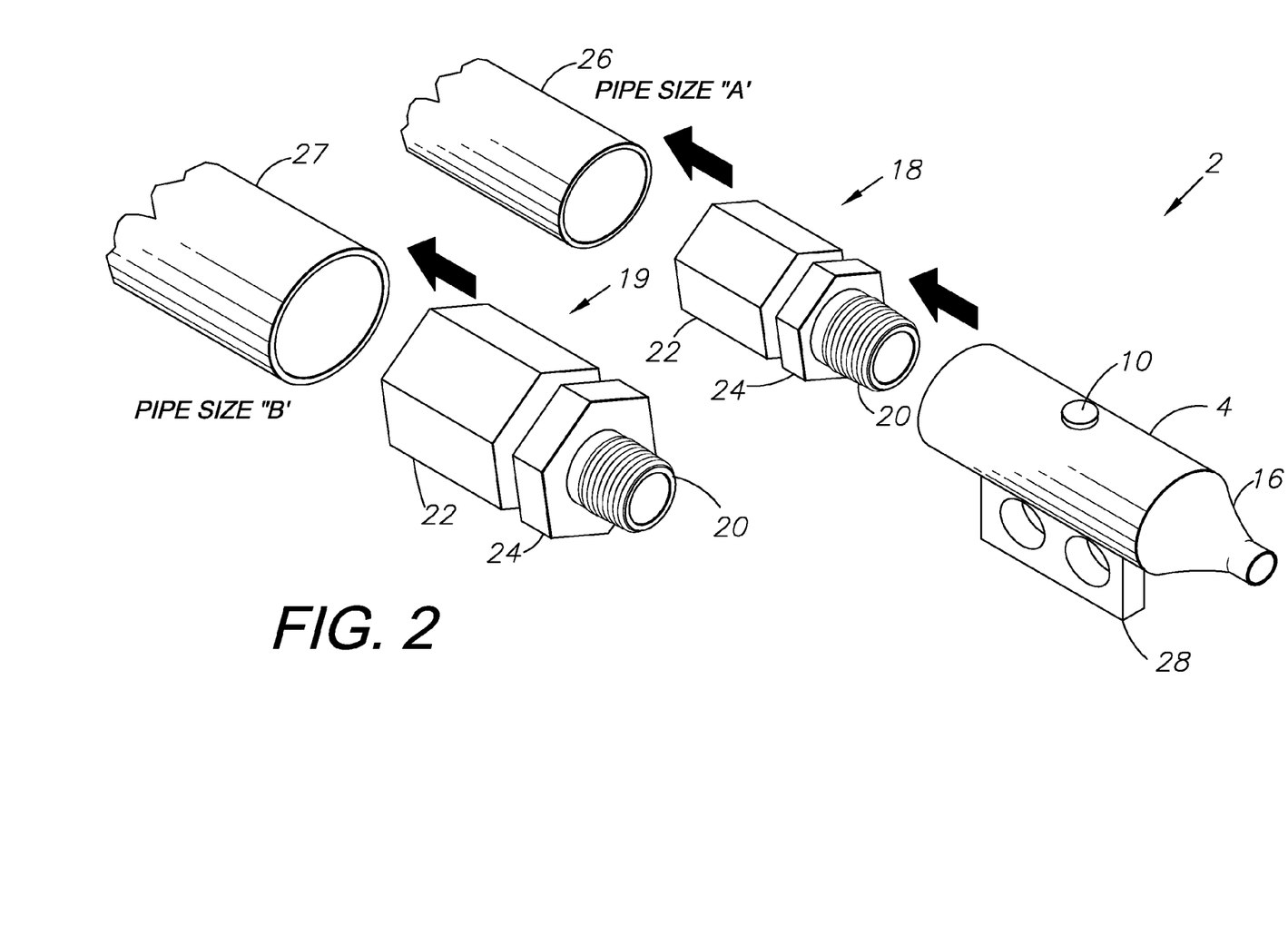
FIG. 2 is an isometric view of an embodiment of the present invention showing two pipe lengths of different diameters and adapters for connecting to the same.

FIG. 2 demonstrates a laser alignment apparatus 2 and two separate adapter sizes 18, 19. The first adapter 18 allows the alignment apparatus 2 to join to a pipe section 26 of "PIPE SIZE 'A'," as indicated. The second adapter 19 allows the alignment apparatus to join to a pipe section 27 of "PIPE SIZE 'B'," as indicated. An unlimited number of adapters is included with an exemplary embodiment of the present invention, to allow the alignment apparatus 2 to be temporarily joined to any pipe size or type.

Figure 3:
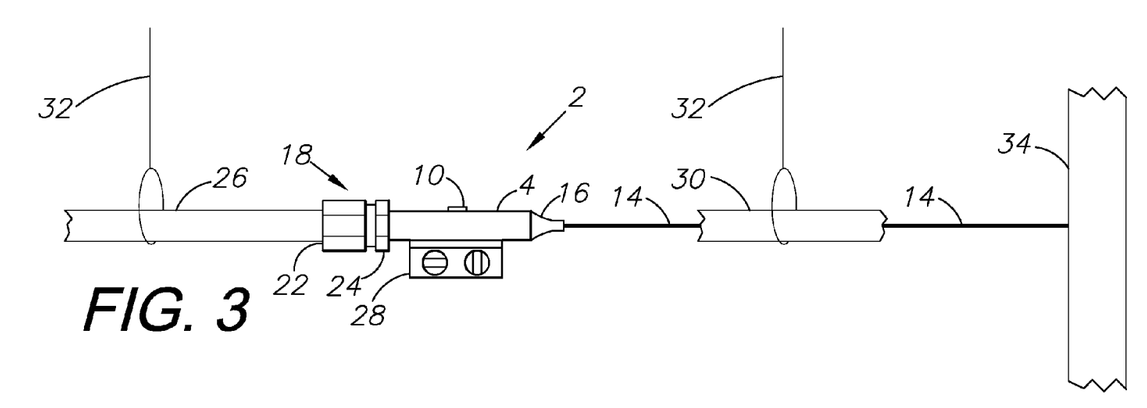
FIG. 3 is a side elevation view of an embodiment of the present invention showing the invention in use.
Figure 4:
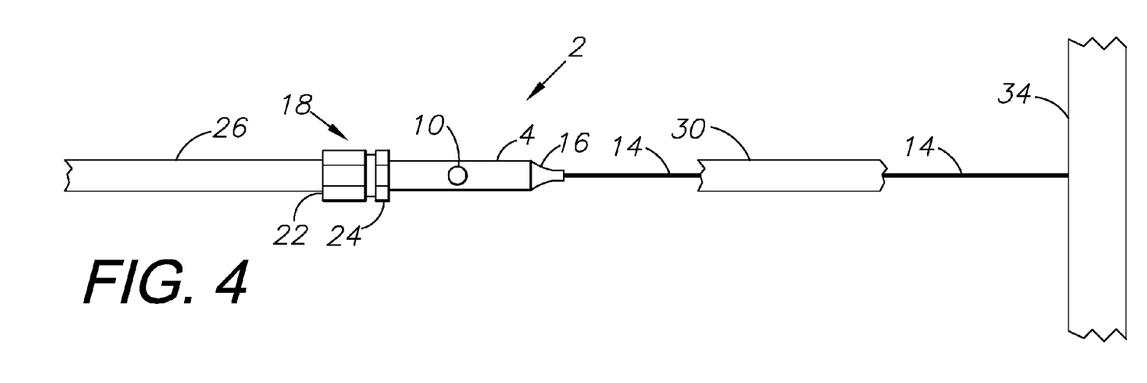
FIG. 4 is a top plan view of an embodiment of the present invention showing the invention in use.

FIGS. 3 and 4 demonstrate an exemplary embodiment of the present invention in use. The laser alignment apparatus 2 is joined to an existing pipe 26 suspended from a pipe hanger 32 via the pipe adapter 18. The laser beam 14 exits the alignment apparatus 2 from the front end and indicates a straight dead-center alignment against an adjacent body 34. The body may be a wall across the room where the pipe is being placed, or any other body in the area adjacent to the end of the existing pipe 26. A future pipe section 30 is shown. Because of the laser alignment, the future pipe section 30 is placed such that the beam 14 would pass through the dead-center of the pipe section 30 if it were suspended by a hanger 32 between the laser alignment apparatus 2 joined to the existing pipe section 26, and the adjacent body 34.

III. Alternative Embodiment Including Telescoping Mirror Attachment 36

Figure 5:
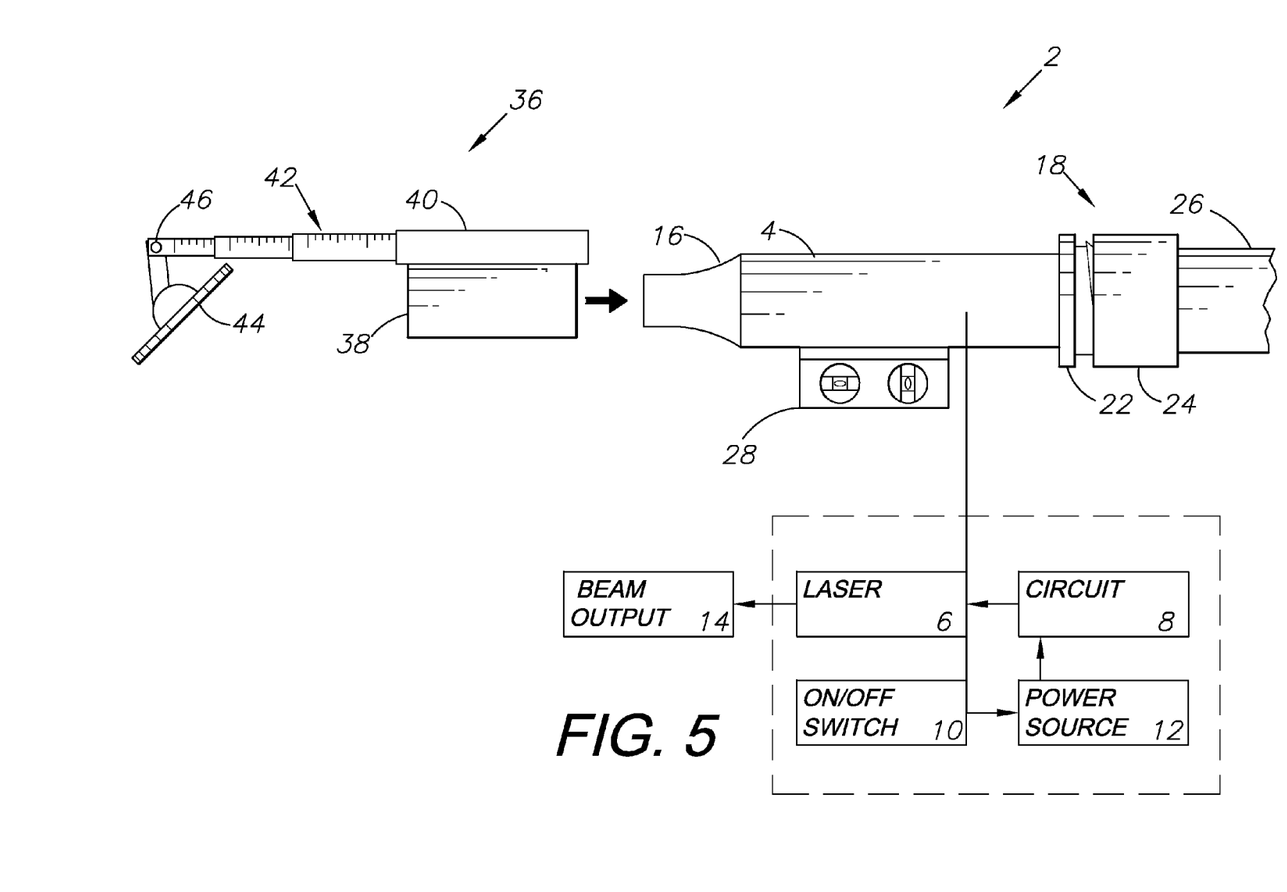
FIG. 5 is a side elevation view of an alternative embodiment of the present invention including a schematic diagram of included components.

FIG. 5 shows a laser alignment apparatus 2 with a telescoping mirror attachment 36. The mirror attachment 36 includes an attachment tube 38, a telescoping body 40 including a number of measurement indication markings 42, and a mirror 44 attached to the end of the telescoping body 40 via a hinged connection 46. The mirror attachment 36 allows redirection of a laser beam output 14 from the laser alignment apparatus 2 at a desired angle, allowing the user to plan a precise turn or bend in the line of conduit or pipe being installed.

The attachment tube 38 allows the mirror attachment 36 to be temporarily affixed to the alignment apparatus 2 via the attachment nose 16. The attachment tube 38 includes an opening which fits over the end of the nose 16, while allowing the laser beam 14 to traverse through the tube 38.

The telescoping body 40 allows the mirror 44 to be extended to a desired distance away from the laser alignment apparatus 2. The measurement indication markings 42 located on the telescoping body 40 allow the user to determine the appropriate length of the next pipe section.

Figure 6:
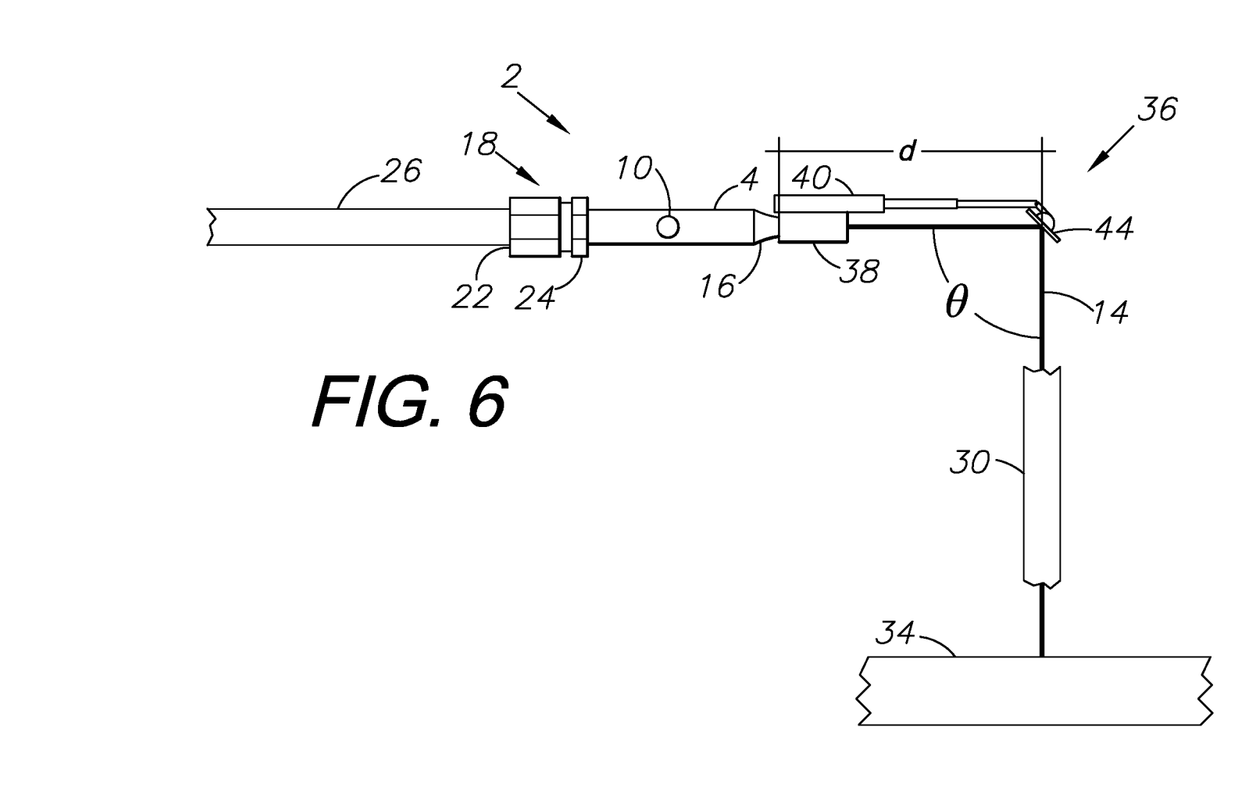
FIG. 6 is a top plan view of the embodiment of FIG. 5, showing the invention in use.

FIG. 6 shows the combination of the laser alignment apparatus 2 and the mirror attachment 36. As before, the laser alignment apparatus 2 is affixed to an existing pipe section 26 via a pipe adapter 18. The mirror attachment 36 is then affixed to the end of the laser alignment apparatus 2.

The telescoping body is extended a distance d to either avoid an obstacle or to otherwise estimate and determine the appropriate distance before an elbow is needed to turn the line of pipe or conduit being installed. The mirror 44 reflects the beam 14 at an angle θ as desired. This angle may be any angle between 1° and 180°, but would typically be either 45° or 90°.

IV. Alternative Embodiment Including Elbow Attachment 48

Figure 7:
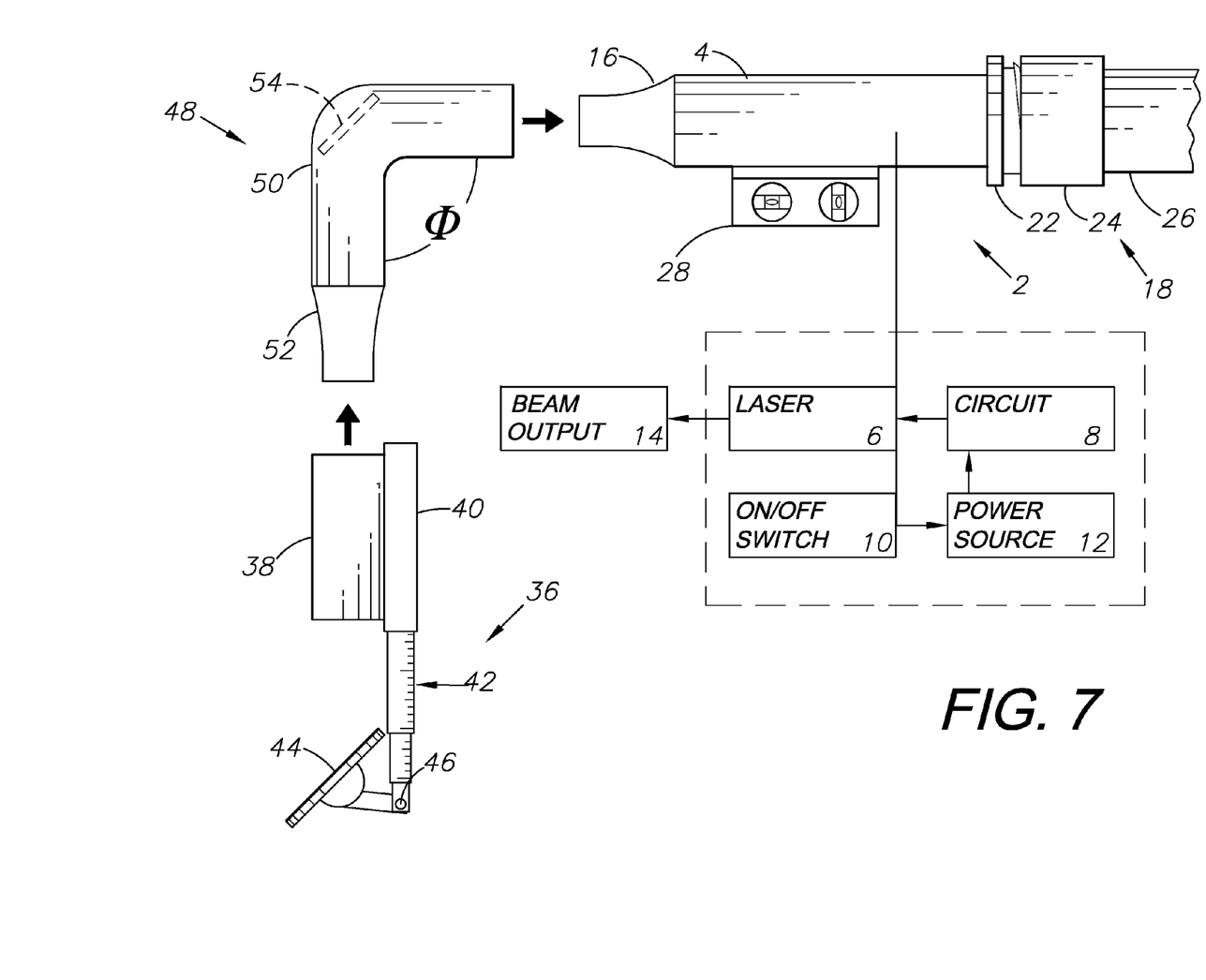
FIG. 7 is a side elevation view of an alternative embodiment of the present invention including a schematic diagram of included components.

FIG. 7 shows a laser alignment apparatus 2 with an elbow attachment 48. The elbow attachment 48 includes an elbow body tube 50, an elbow attachment nose 52, and an elbow mirror 54. The elbow body tube 50 forms an angle Φ. The elbow mirror 54 is placed at the bend inside of the hollow elbow body tube 50, and allows an output laser beam 14 to be diverted by the angle Φ of the elbow body tube 50.

The elbow attachment 48 is temporarily affixed to the laser alignment apparatus 2 via the attachment nose 16. The elbow attachment 48 includes a similar elbow attachment nose 52 which allows the mirror attachment 36 to be temporarily affixed to the end of the elbow attachment 48. This combination creates a means by which a laser beam output 14 may be redirected twice to avoid an obstacle or to create a complex turn in a line of pipe or conduit being installed.

Figure 8:
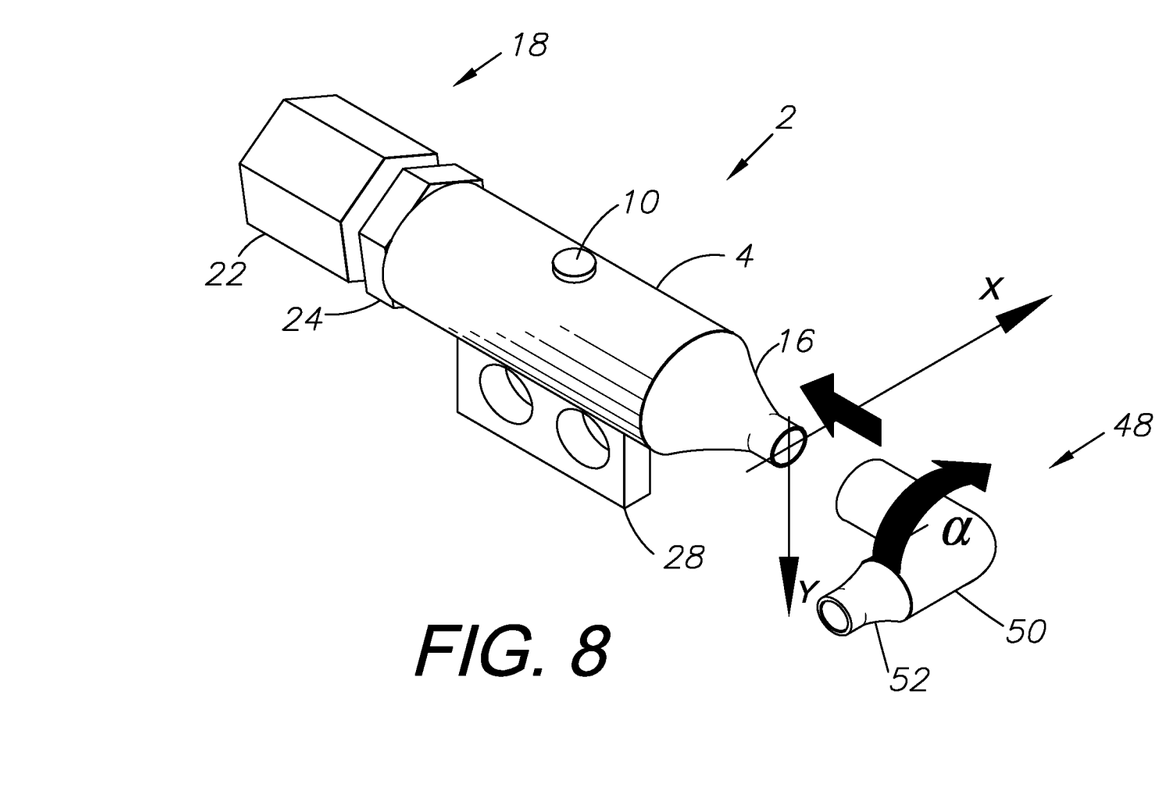
FIG. 8 is an isometric view of the embodiment of FIG. 7.

FIG. 8 shows the elbow attachment 48 interacting with the laser alignment apparatus 2. The elbow attachment 48 may be placed onto the alignment apparatus at a predetermined angle α, and remains fixed at that angle until the elbow is removed. A number of predetermined angle positions may be defined such that the elbow attachment 48 can be placed into a variety of configurations onto the laser alignment apparatus 2. The attachment nose 16 may include a number of notches or catches which prevent the elbow attachment 48 from being attached at any angle other than those desired. A 2-dimensional coordinate plane is shown, including an X-axis and a Y-axis. Typically, the elbow attachment 48 could only be placed onto the attachment nose 16 such that the laser beam 14 is redirected exactly upon either the X-axis or Y-axis, as shown.

Figure 9A:
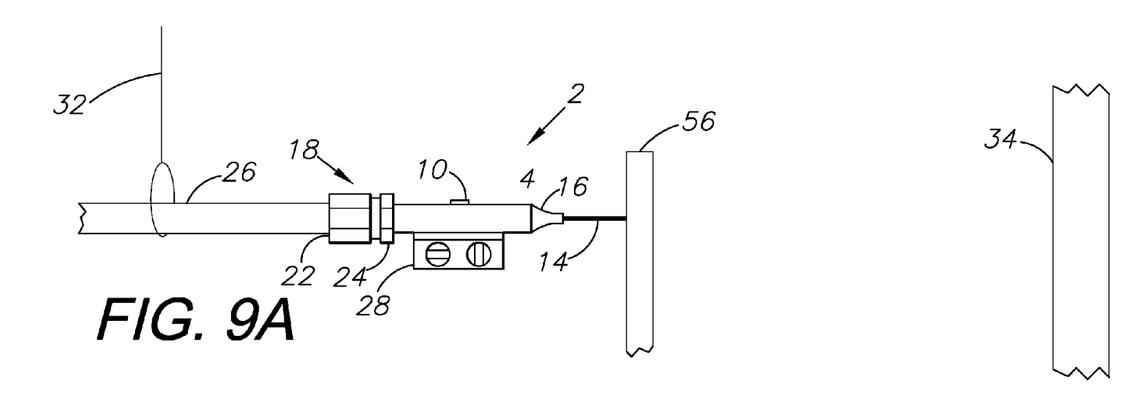
FIG. 9A is a side elevation view of the embodiment of FIG. 7, presenting a problem to be solved using that embodiment.
Figure 9B:
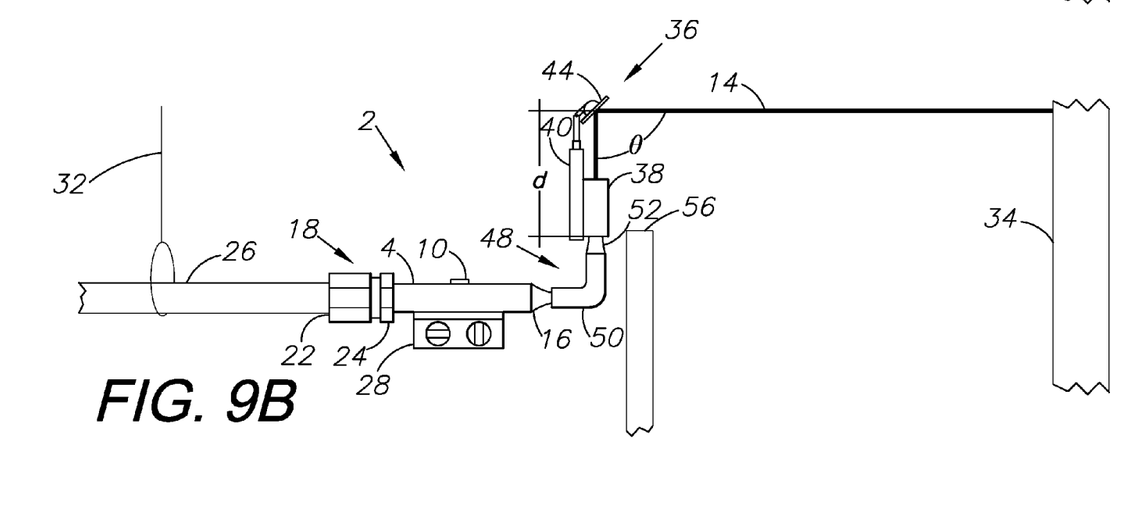
FIG. 9B is a side elevation view of the embodiment of FIG. 7, showing the solution to the problem presented in FIG. 9A.

FIG. 9A presents a situation where a vertical obstacle 56, such as a wall, is impeding the laser beam 14. The user will need to create a vertical bend or a turn in the pipe or conduit being installed to avoid the obstacle 56. FIG. 9B demonstrates how the combination of the laser alignment apparatus 2, the elbow attachment 48, and the mirror attachment 36, allows the user to accurately plan the path by which the pipe may be installed to avoid the obstacle 56. The elbow attachment 48 redirects the laser beam 14 such that it is again redirected by the mirror 44 of the mirror attachment 36 at an angle θ and indicates on the target body 34 the precise dead-center location of where the pipe should run.

Figure 10A:
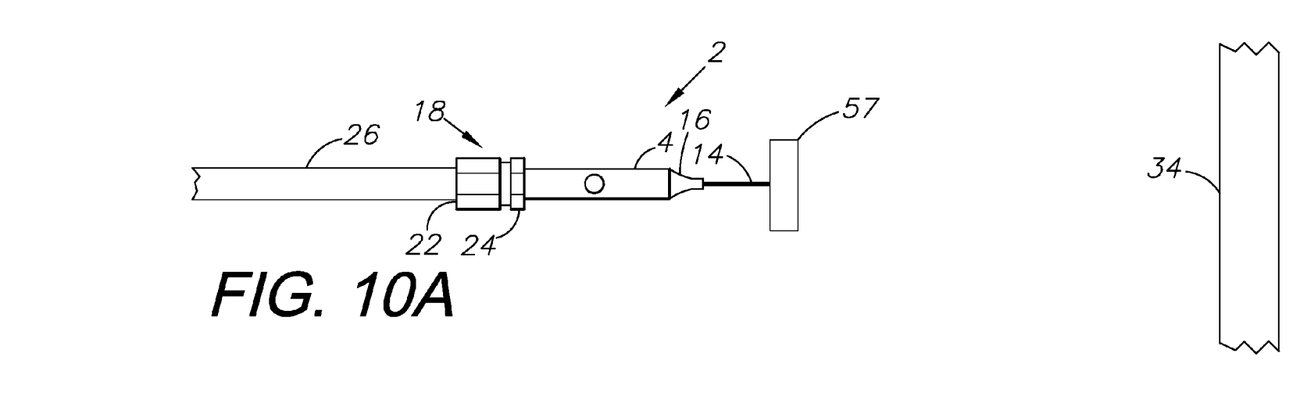
FIG. 10A is a top plan view of the embodiment of FIG. 7, presenting a problem to be solved using that embodiment.
Figure 10B:
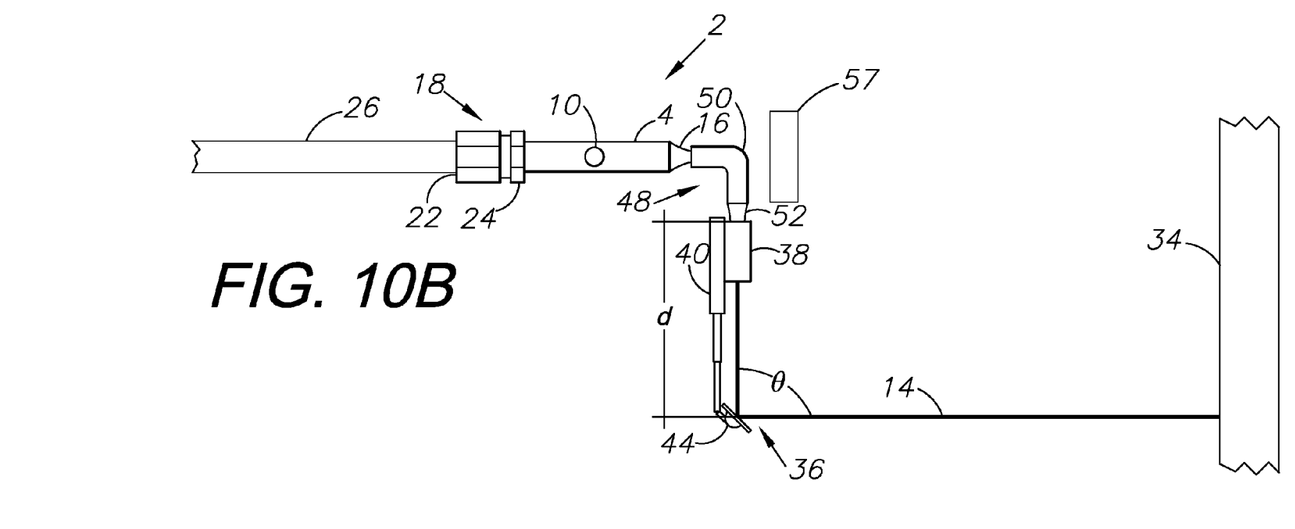
FIG. 10B is a top plan view of the embodiment of FIG. 7, showing the solution to the problem presented in FIG. 10A.

Similarly, FIG. 10A presents a situation where a horizontal obstacle 57, such as a wall, is impeding the laser beam 14. The user will need to create a horizontal bend or a turn in the pipe or conduit being installed to avoid the obstacle 57. FIG. 10B demonstrates how the combination of the laser alignment apparatus 2, the elbow attachment 48, and the mirror attachment 36, allows the user to accurately plan the path by which the pipe may be installed to avoid the obstacle 57. The elbow attachment 48 redirects the laser beam 14 such that it is again redirected by the mirror 44 of the mirror attachment 36 at an angle θ and indicates on the target body 34 the precise dead-center location of where the pipe should run.

The versatility of this combination of components allows a person installing pipe or conduit to accurately plan and measure the best route for installing the pipe or conduit. The elbow attachment 48 allows the user to avoid vertical and horizontal obstacles 56, 57, and the mirror attachment 36 allows the user to accurately predict the optimum position for a turn or bend in the pipeline, and provides accurate measurement for the section of pipe leading up to that bend or turn.

V. Alternative Embodiment or Aspect Laser Alignment Apparatus 102

An alternative embodiment laser alignment apparatus 102 is the preferred embodiment for a laser alignment apparatus used with pipe or conduit, and is shown in FIGS. 11-17. The object of the embodiment is to provide an adjustable laser alignment apparatus 102 for use with pipe or conduit of varying diameter.

Figure 11:
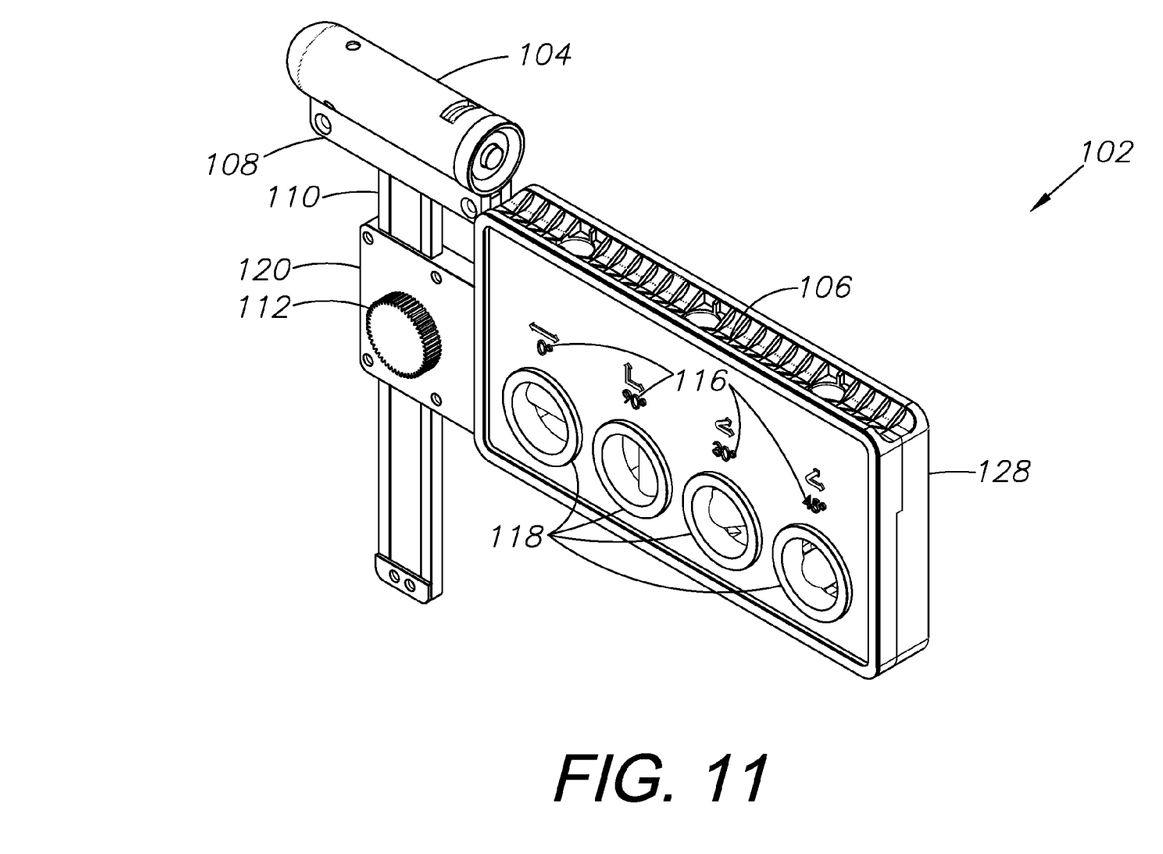
FIG. 11 is an isometric view of an alternative embodiment of the present invention.

Referring to FIG. 11, a laser housing 104 including a laser housing mount 108 is rigidly mounted to the top of a vertical slide 110. The slide is inserted into a slide housing 120, and is kept in place via a locking wheel 112. The wheel can be turned counterclockwise to release the slide, allowing the user to move the slide vertically up or down depending upon the diameter of a pipe or conduit. The wheel is then turned clockwise to lock the slide in place.

The slide housing 120 is fixedly attached to a bubble level 128 including multiple bubble level indicators 118. Each indicator includes a label 116 depicting what angle that particular indicator is measuring.

The top edge of the bubble level 128 includes a pipe mounting groove interface 106. This groove is designed to accept the bottom curve of a length of pipe or conduit, and makes it easier on a user to maintain a straight alignment of the laser alignment apparatus 102 on the pipe or conduit. The bubble level 128 may include magnets on the upper edge of the housing to allow the level to magnetically adhere to a length of pipe or conduit. Other connection means may also be used, such as a quick-tie or removable adhesive.

Figure 12:
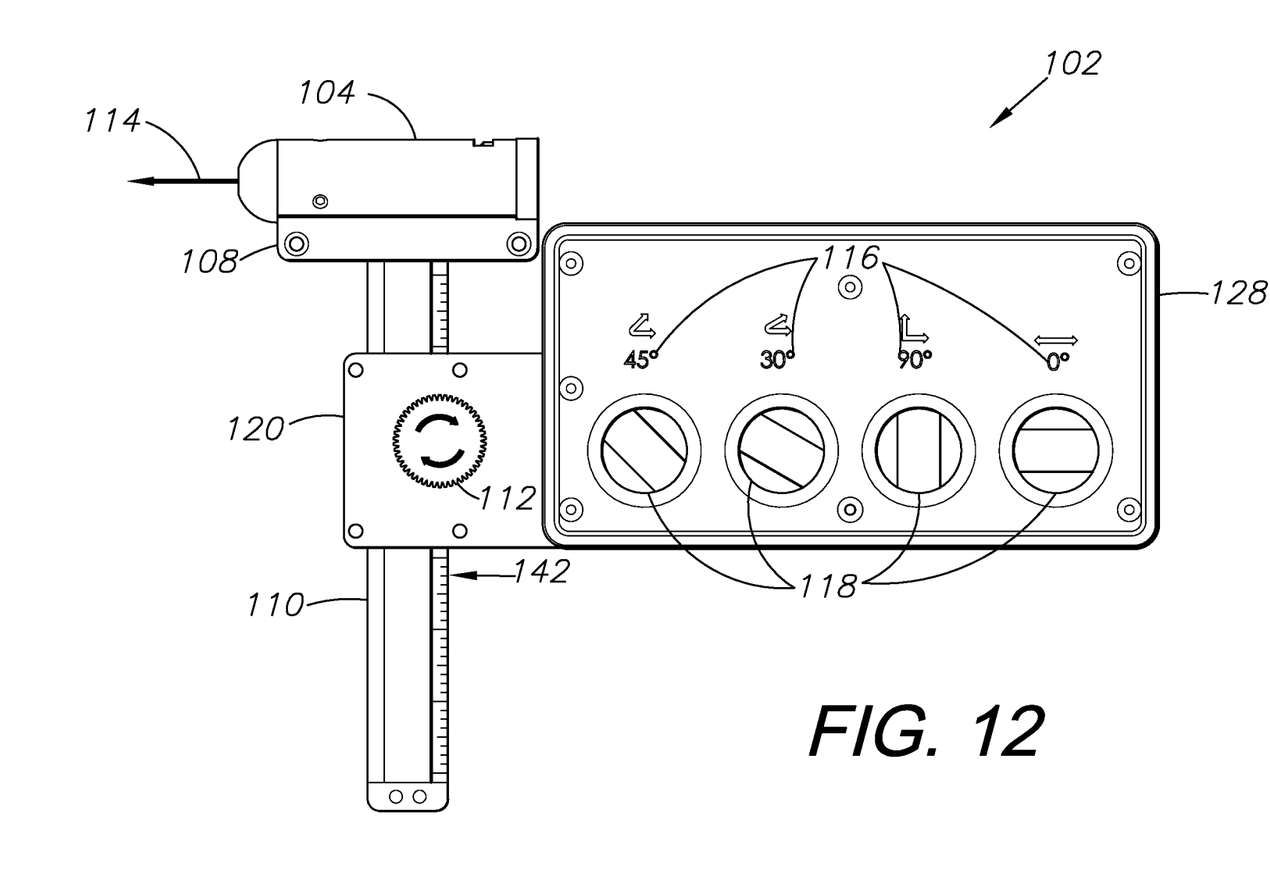
FIG. 12 is a right-side elevation view of the same.
Figure 13:
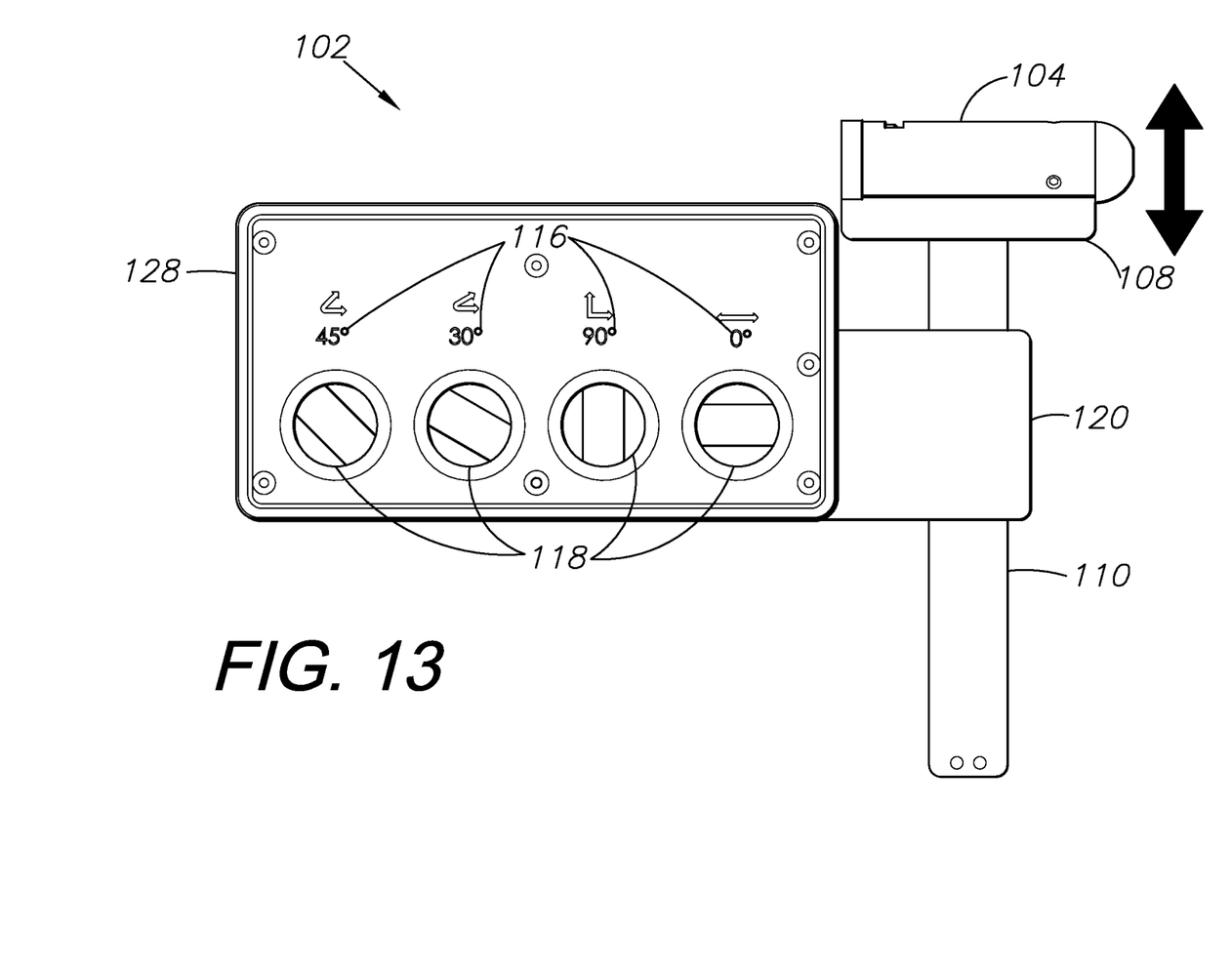
FIG. 13 is a left-side elevation view of the same.
Figure 14:
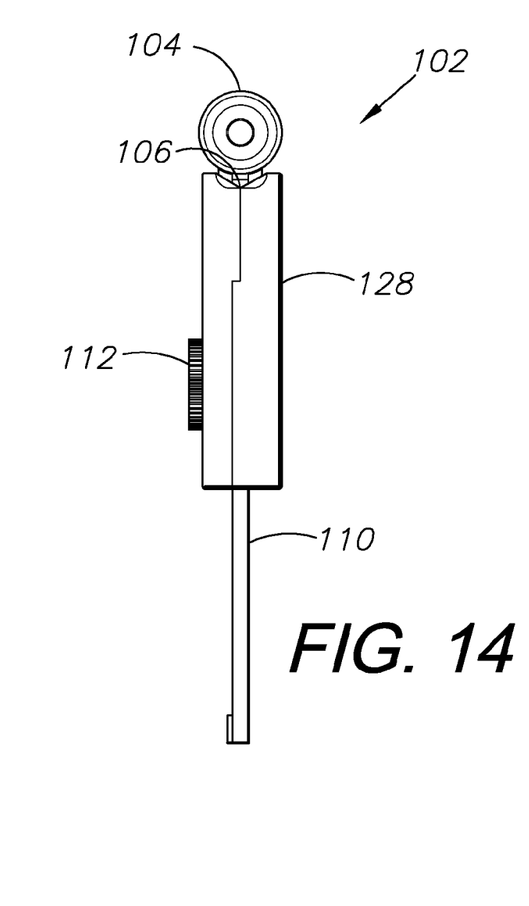
FIG. 14 is rear elevation view of the same.
Figure 15:
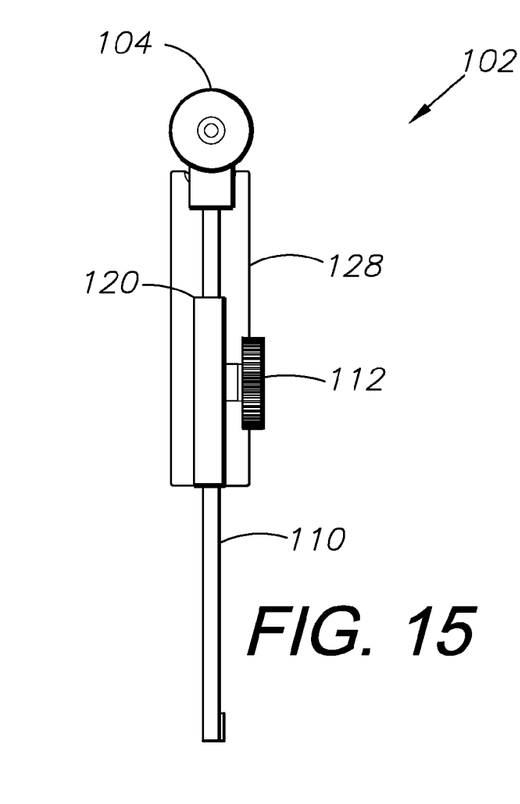
FIG. 15 is a front elevation view of the same.
Figure 16:
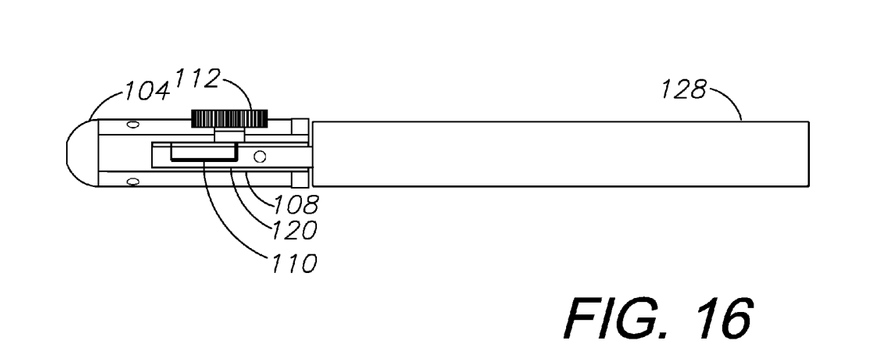
FIG. 16 is a bottom plan view of the same.
Figure 17:
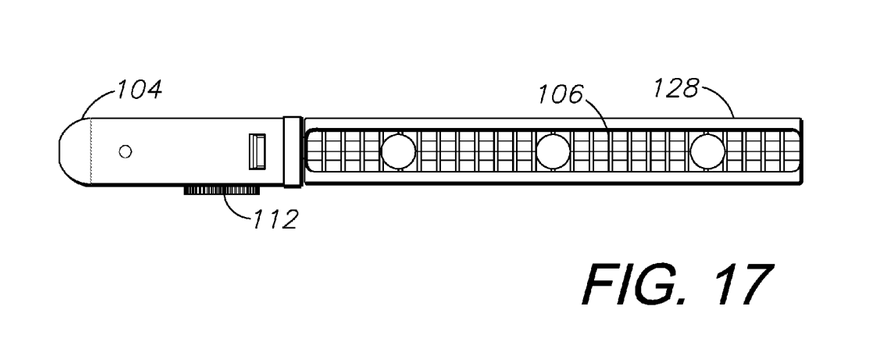
FIG. 17 is a top plan view of the same.

As shown in FIG. 12, the laser housing 104 which includes the laser hardware produces an alignment laser beam 114 away from the end of a length of pipe or conduit. As with the previous embodiment, this beam is used to align the length of pipe with existing or future pipe sections. A number of pipe diameter indicators 142 may be included on the slide 110 to allow the user to pre-select the diameter of the pipe or conduit being aligned. With the proper diameter selected, the laser alignment apparatus 102 ensures dead-center alignment for conduits and pipe.

This embodiment can be used in any of the arrangements previously shown in FIGS. 3-10. This embodiment does not require multiple attachments for use with varying pipe diameters.

It is to be understood that the invention can be embodied in various forms, and is not to be limited to the examples discussed above. The range of components and configurations which can be utilized in the practice of the present invention is virtually unlimited.

Having thus described the invention, what is claimed as new and desired to be secured by Letters Patent is:

1. A laser alignment apparatus comprising:
   a laser housing including a laser connected, a power source connected to said laser, and a switch operable to turn said laser on and off;
   a laser housing mount affixed to said laser housing;
   a slide including a top end and a bottom end, wherein said laser housing mount is affixed to said slide top end;
   a slide housing capable of receiving said slide, and wherein said slide is capable of sliding vertically;
   a slide lock configured to lock and release said slide within said slide housing; and
   a primary housing adapted to conform to the outer surface of a rigid tube, wherein said primary housing is rigidly affixed to said slide housing.

2. The apparatus of claim 1, wherein said primary housing consists of at least one bubble level.

3. The apparatus of claim 2, further comprising:
   said primary housing including a top edge, a bottom edge, and a front edge; and
   said primary housing top edge including a groove.

4. The apparatus of claim 3, wherein said primary housing top edge includes a plurality of magnets.

5. The apparatus of claim 1, further comprising:
   a plurality of indicator markings located on a face of said slide; and
   wherein said indicator markings relate to a diameter of said rigid tube.

6. The apparatus of claim 5, further comprising:
   wherein said tube is a length of electrical metallic tubing conduit; and
   wherein said indicator markings comprise standard measurement lengths in imperial units.

7. The apparatus of claim 5, further comprising:
   wherein said tube is a length of plumbing pipe; and
   wherein said indicator markings comprise standard measurement lengths in imperial units.

8. The apparatus of claim 1, further comprising;
   an elbow operable to affix temporarily to said laser housing, said elbow including a mirror; and
   wherein said elbow is capable of altering the direction of a beam produced by said laser.

9. A laser alignment apparatus comprising:
   a laser housing including a laser connected, a power source connected to said laser, and a switch operable to turn said laser on and off;
   a laser housing mount affixed to said laser housing;
   a slide including a top end and a bottom end, wherein said laser housing mount is affixed to said slide top end;
   a slide housing capable of receiving said slide, and wherein said slide is capable of sliding vertically;
   a slide lock configured to lock and release said slide within said slide housing;

a primary housing including at least one bubble level indicator, a top edge, a bottom edge, a front edge, and a rear edge, wherein said primary housing top edge is adapted to conform to the outer surface of a rigid tube, and wherein said primary housing rear edge is rigidly affixed to said slide housing; and a plurality of indicator markings located on a face of said slide, wherein said indicator markings relate to the diameter of said rigid tube in imperial units.

10. A method of installing rigid tubing, the method comprising the steps:

providing a laser alignment device including a laser, a slide, and a housing, wherein said laser is affixed to said slide and said slide is operable to slide vertically through said housing;

providing a first and a second length of rigid tubing;

adjusting said slide according to the diameter of said rigid tubing, such that said laser is located at the center of said tubing;

powering said laser;

temporarily affixing said laser to said tubing;

noting the path of a beam produced by said laser; and placing said second length of rigid tubing in line with said beam, such that said first and second lengths of rigid tubing are in alignment.

11. The method of claim 10, further comprising the steps:

providing a locking wheel operable to temporarily lock said slide within said housing.

12. The method of claim 11, wherein said slide includes a plurality of indicator markings relating to the diameter of said rigid tubing.

13. The method of claim 10, wherein said housing includes a top edge is adapted to conform to the outer surface of said rigid tubing.

* * * * *